Patented Dec. 18, 1934

1,984,983

UNITED STATES PATENT OFFICE 1,984,983

SOLVENT OR PLASTICIZER FOR COMPOSITIONS WITH CELLULOSE DERIVATIVES

Leonard Nicholl, Nyack, N. Y., assignor to Kay-Fries Chemicals, Inc., West Haverstraw, N. Y., a corporation of New York No Drawing. Application December 6, 1932, Serial No. 645,949

14 Claims. (Cl. 106—40)

This invention relates to the manufacture of solutions, films, lacquers, enamels, plastics, coatings or other compositions, preparations or articles made with derivatives of cellulose.

In addition to the volatile solvents or diluents generally used in making solutions (hereinafter referred to as compositions) with cellulose derivatives, or in some situations without such volatile solvents, higher boiling solvents, called plasticizers, are employed for the cellulose derivative or derivatives forming the basis of the compositions. By the term "plasticizer" is, therefore, meant herein a material imparting flexibility to films comprising derivatives of cellulose, such as cellulose acetate, and of such low volatility that such material will remain for a long period of time as a constituent of the film or coating of which it originally forms a part. The choice of plasticizers has heretofore been confined to relatively few of the available substances and all of these have one or more undesirable characteristics or fall short of affording to the composition the maximum of desired qualities.

One object of the present invention is to provide a plasticizer for compositions with cellulose derivatives which can be used for many purposes, such as lacquers, films, enamels, plastics, coating fabrics and the like.

The invention also has for its object to provide compositions with cellulose derivatives producing films having greater durability and pliability.

It is also an object of the invention to provide a plasticizer which shall produce an improved composition with cellulose derivatives.

It is also an object of the invention to provide a plasticizer for cellulose derivatives having a methyl or methylene ether group and manifesting an increased solvent power thereby increasing the amount of cellulose ester entering the solution and whereby films made therefrom shall have greater flexibility and other desirable properties in increased degrees.

These objects are accomplished broadly by using as plasticizers for cellulose esters and acetates, an ester comprising a methylene ether group. These esters have exceptional solvent properties, are non-exuding and impart to the cellulose derivative films containing them, greater pliability and wearing qualities. Of the various esters that may be used, particular mention is made of esters or ester compounds of polybasic acids containing at least one methylene glycol group and especially such as have methylene glycol mono ethers in place of an ordinary alcohol group. An example of such is what I have named methyl ether of methylene glycol phthalate having the formula:

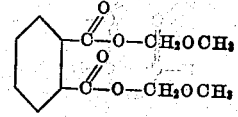

and produced for example by reacting anhydrous sodium phthalate with monochlor methyl ether to produce an ester of phthalic acid comprising a methoxy methylene glycol group.

The reaction may be expressed by the formula:

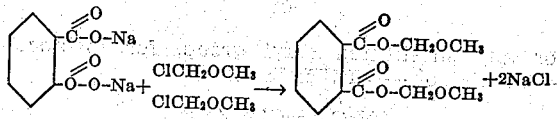

A specific example illustrating a composition contemplated, but without intent to restrict the same, is given as follows:

| | Parts |
|---|---|
| Cellulose acetate | 100 |
| A low boiling composite solvent composed of 85% acetone and 15% methanol | 400 |
| Methyl ether of methylene glycol phthalate | 50 |

This composition may be used for any suitable purpose and any suitable pigments may be added, if desired. The proportions of the various ingredients may vary over a wide range, depending almost entirely upon the proportions desired in the finished composition and the use to which it is to be put. Any suitable solvents may be used, as is well known in the art, either singly or in admixture.

It will be understood that other compounds comprising a methylene ether group may be used as plasticizers having the desirable properties accruing presumably from the methyl or methylene ether group and among such may be given by way of examples, although not by any means all, for instance, a plasticizer obtained by the reaction of the salt of a substituted dibasic cyclic carboxylic acid with a halogen methyl ether and having the formula:

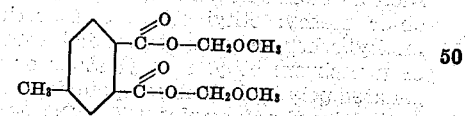

and similarly a plasticizer made by reacting the salt of a dibasic straight chain saturated carboxylic with a halogen methyl ether and expressed by the formula:

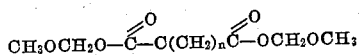

Broadly, a plasticizer is contemplated resulting from a reaction in which one or more carboxyl hydrogens of polybasic acids are replaced by methylene ether groups of the type —$CH_2OR$ where "R" may be any alkyl group, for instance —$CH_3$ or —$CH_2OCH_3$, or any cyclic group (alicyclic or heterocyclic), for example, a benzene ring such as:

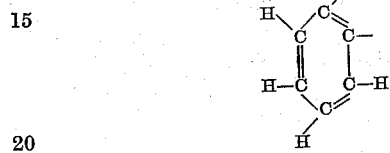

or a pyridine group, such as:

or a furane group, such as:

or any substituted alkyl group, for instance —$CH_2NH_2$ or —$CH_2CH_2NH_2$ or

—$CH_2OCH_2OCH_2OCH_3$, or any substituted cyclic group, for instance:

or a mixed aliphatic-cyclic group, for instance:

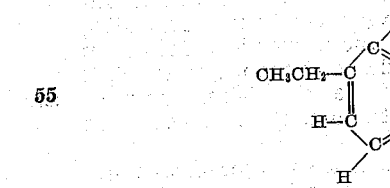

or derivative thereof.

The plasticizer of this invention is thus, conveniently, one or more compounds of a dibasic acid, such as phthalic, succinic, tartaric, and/or maleic acids, and/or metallic salts of half esters of such acids, for example, disodium phthalate or monosodium methyl phthalate or calcium phthalate, reacted with halogen methylene ethers, such as monochlor methyl methyl ether, monochlor methyl ethyl ether, symmetrical dichlor methyl ether, unsymmetrical dichlormethyl ether or monobrom ethyl methyl ether or with halogenated polymethylene compounds such as represented by the formula: $ClCH_2OCH_2OCH_3$. Obviously, those contemplated may be either saturated or unsaturated.

It has been found by experiment that films made as herein described are far superior to the compositions with cellulose derivatives heretofore known when made with a plasticizer such as dimethyl phthalate and have shown a 70% greater flexibility when tested on a Schopper fold test machine, for instance. Further a greater amount of the cellulose derivative goes into solution, it has been found.

Various modifications will occur to those skilled in the art in the formula of the compound forming the plasticizer of this invention so long as it comprises a methylene ether group as well as the proportions and other ingredients used to make compositions with cellulose derivatives, and no limitation is intended by the phraseology of the foregoing description except as indicated in the appended claims.

What is claimed is:
1. A composition of matter comprising a cellulose derivative and an ester of a polycarboxylic acid in which the hydrogen of at least one of the carboxyl groups is replaced by an alkoxy methylene group.
2. A composition of matter comprising a cellulose derivative and an ester of a polycarboxylic acid in which the hydrogens of the carboxyl groups are replaced by alkoxy methylene groups.
3. A composition of matter comprising a cellulose derivative and an ester of an aromatic polycarboxylic acid in which the hydrogen of at least one of the carboxyl groups is replaced by an alkoxy methylene group.
4. A composition of matter comprising a cellulose derivative and an ester of an aliphatic polycarboxylic acid in which the hydrogen of at least one of the carboxyl groups is replaced by an alkoxy methylene group.
5. A composition of matter comprising a cellulose derivative and an ester of an aromatic polycarboxylic acid in which the hydrogens of the carboxyl groups are replaced by alkoxy methylene groups.
6. A composition of matter comprising a cellulose derivative and an ester compound of phthalic acid in which the hydrogen of at least one of the carboxyl groups is replaced by an alkoxy methylene group.
7. A composition of matter comprising a cellulose derivative and an ester of phthalic acid in which the hydrogens of the carboxyl groups have been replaced by alkoxy methylene groups.
8. A composition of matter comprising a cellulose derivative and an ester compound of phthalic acid in which the hydrogen of one of the carboxyl groups is replaced by an alkoxy methylene group and the hydrogen of the other group is replaced by an alkyl group.
9. A composition of matter comprising a cellulose derivative and the methyl ether of methylene glycol phthalate.
10. A composition of matter comprising cellulose acetate, a low boiling composite solvent therefor and an ester of a polycarboxylic acid in which the hydrogen of at least one of the carboxyl groups is replaced by an alkoxy methylene group.
11. A composition of matter comprising cellulose acetate, a low boiling composite solvent and the methyl ether or methylene glycol phthalate.
12. A composition of matter comprising a cellulose derivative and an ester of a polycarboxylic acid in which the hydrogen of at least one of the carboxyl groups is replaced by an alkoxy methylene group.

13. A composition of matter comprising a cellulose derivative and an ester of a polycarboxylic acid in which the hydrogen of at least one of the carboxyl groups is replaced by a methoxy-methoxy methylene group.

14. A composition of matter comprising a cellulose derivative and as a plasticizer therefor the ester of a polycarboxylic acid in which the hydrogen of at least one of the carboxyl groups is replaced by the radical of a mono ether of methylene glycol having the structural formula —CH$_2$OR.

LEONARD NICHOLL.